UNITED STATES PATENT OFFICE.

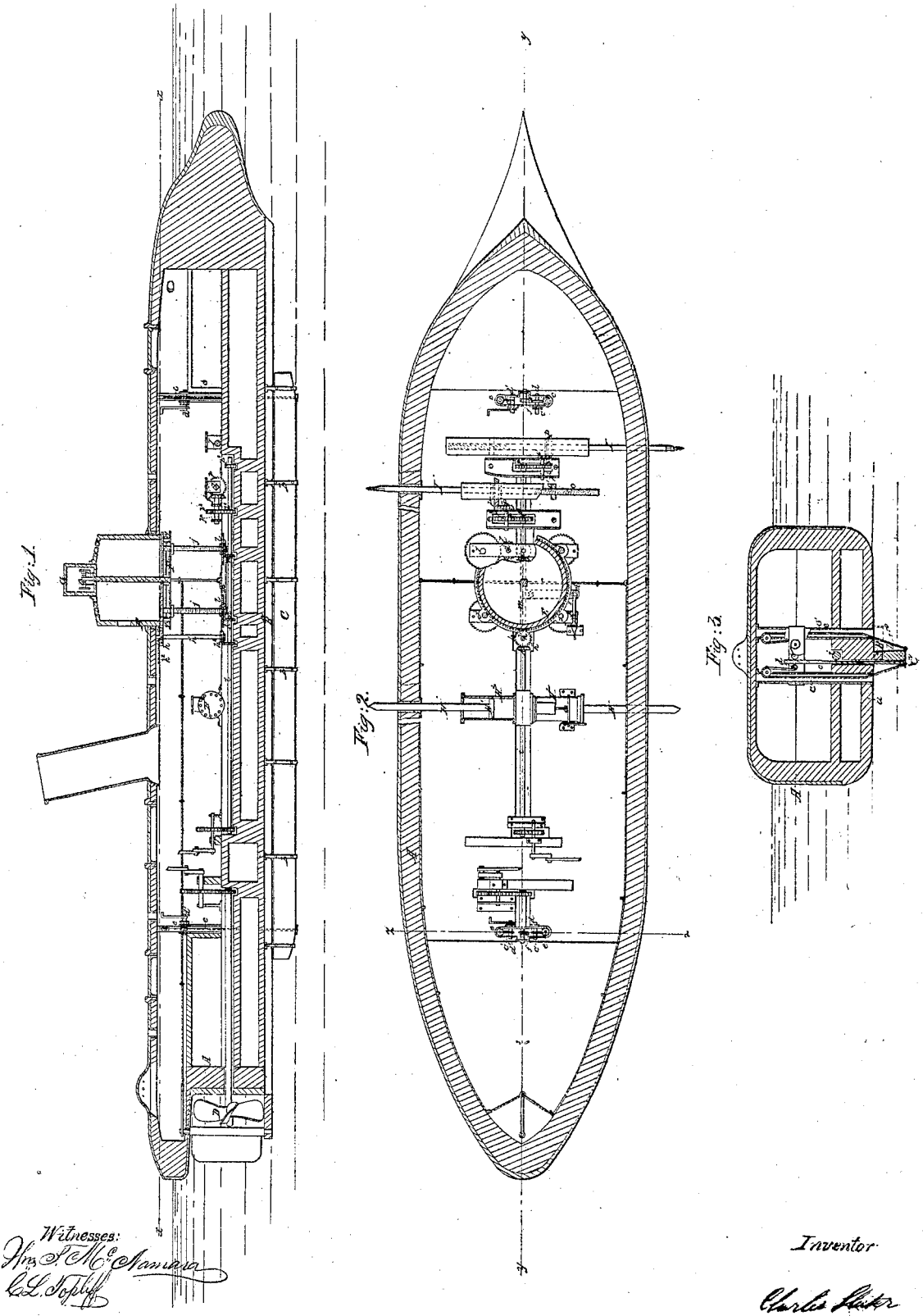

CHARLES SLATER, OF BROOKLYN, NEW YORK.

IMPROVED SHIP OF WAR.

Specification forming part of Letters Patent No. 47,463, dated April 25, 1865.

*To all whom it may concern:*

Be it known that I, CHARLES SLATER, of Brooklyn, in the county of Kings, and State of New York, have invented a new and useful Improvement in Iron-Clad and other Vessels; and I do hereby declare that the following is a full, clear, and exact description thereof, which will enable those skilled in the art to make and use the same, reference being had to the accompanying drawings, forming a part of this specification, in which—

Figure 1 is a longitudinal vertical section of this invention, the line $y\,y$, Fig. 2, indicating the plane of section. Fig. 2 is a horizontal section of the same, the plane of section being indicated by the line $x\,x$, Fig. 1. Fig. 3 is a transverse vertical section of the same taken in the plane indicated by the line $z\,z$, Fig. 2.

Similar letters of reference indicate corresponding parts.

This invention consists in the application to a vessel of a hinged adjustable shifting keel connected to the main keel and operated by devices hereinafter described in such a manner that it can be turned down to a perpendicular position whenever it may be desirable to increase the steadiness of the vessel, or that it can be turned up on the side of the main keel, if the latter is deemed sufficient to keep the vessel steady.

The invention relates also to a certain novel arrangement for operating steam-rams and scuttling-rams or augers extending through the sides of the vessel and calculated to produce holes in a hostile vessel either by blows or by boring such holes, as may be most convenient.

A represents the hull of a vessel built in any suitable shape, in the form of a monitor, or of an iron-clad, or other vessel with flat bottom $a$, as clearly shown in Fig. 3 of the drawings. Said hull is provided with a stationary keel, B, of the ordinary shape, and extending from stem to stern, and attached to this main keel is the additional shifting keel C. The length of this additional keel is about one-half (more or less) of that of the main keel, and it is connected to said main keel by straps $b$, so that it can be turned down to a perpendicular position, as shown in Fig. 1 and in Fig. 3 in black outlines, or that it can be turned up to a horizontal position close under the bottom of the vessel, as shown in red outlines in Fig. 3.

This additional keel is operated by means of two sets of chains or ropes, $c\,c'$, one set to raise the same and the other to depress it. These chains connect with the end of the keel, and they are attached to shafts $d\,d'$, whence they pass down through suitable pipes, $e$, which extend above the water-line, and which may be closed by suitable valves or plugs when the additional keel has been adjusted in the desired position. The ropes $c$, which serve to depress the additional keel from its horizontal position, pass over rollers in the ends of vertically-adjustable bars $f$, so as to give to said ropes a purchase which they could not have if drawn from the bottom edge of their pipes directly to the additional keel. The bars $f$ are depressed, when their aid is required, by the action of a pinion gearing in teeth cut in their edge, as clearly shown in Fig. 3, and after the additional keel has been adjusted in the desired position said bars are raised so as not to interfere with the motion of the vessel, or that they are not liable to sustain any injury.

The vessel is propelled by a screw, D, to which motion is imparted by a steam-engine in the usual manner. This screw is situated far enough under the stern to be protected against hostile shot or shell under all circumstances.

E is the turret, which projects from a suitable hole in the deck of the vessel. Two or more turrets may be used. Said turret is supported by a platform or frame, F, on which it revolves by means of wheels $g$, rotary motion being imparted to it by the pinion $h$ on the vertical shaft $h'$ gearing in a toothed rim attached to the bottom of the turret. The shaft $h'$ derives its motion, by means of a bevel-gear, $h^2$, from a longitudinal horizontal shaft, $i$, to which motion is imparted by a separate engine. The frame F, which supports the turret, rests upon perpendicular screw-spindles $j$ in such a manner that by turning said screw-spindles the frame, together with the turret, are raised or lowered. Motion is imparted to said screw-spindles by bevel-wheels $k$ on the horizontal shaft $i$, and by a series of cog-wheels, $l$, which gear the several screw-spindles together in such a manner that all move simultaneously and with a uniform speed. By this arrangement the turret can be raised and lowered by the action of the same engine which serves to rotate the same, and if the vessel is not in action the turret is lowered and the motion of the vessel, particularly in a heavy sea, is considerably lessened. The bevel-wheels $k$ are attached to the horizontal shaft $i$, so that they are compelled to rotate with the same, but are allowed to slide on it in a longitudinal direction. They are connected to each other by straps $m$, running parallel with the shaft $i$, and these straps are attached to a hand-lever, $m'$, which connects with a catch, $m^2$, so that by shifting this catch the bevel-wheels $k$ can be thrown in and out of gear with the gear of the screw-spindles $j$. After the turret has been raised or lowered to the desired position, the bevel-wheels $k$ are thrown out of gear and the motion of the horizontal shaft $i$ can be continued without producing any effect on the vertical position of the turret. After the turret has been raised to its highest position the pinion $h$ is thrown in gear with its rim, and it can be rotated in the ordinary manner. In order to throw the pinion in gear with the rim of the turret the upper end of its shaft is attached to a lever, $h^*$, or it may be arranged in any other convenient manner capable of effecting this purpose. The port-holes and internal arrangements of the turret are similar to that of turrets of the ordinary description. The top of the turret is perforated with a number of small holes for ventilation, and from the center of said top rises the pilot-house G. The steering rope or chain extends from the drum $n$ down through a central tube, and it is so arranged that it does not interfere with the rising and falling of the turret.

Two steam rams, H H, are arranged amidships, or in any other convenient position of the vessel, six feet, more or less, below the water-line. These steam-rams are connected to pistons H', which work in steam-cylinders H² in the ordinary manner. By admitting a full head of steam to the inner ends of these cylinders the rams are driven out with great force and a hostile vessel can be pierced below the water-line by a few blows. If the vessel is constructed of iron, or if it is of such strength that the blows of the rams prove ineffectual, or if circumstances make it desirable to produce a hole in a hostile vessel without much noise, the scuttling-augers I are brought in action. These augers extend through suitable stuffing-boxes in the sides of the vessel, and they are by suitable gear from the horizontal shaft $i$. The shanks of the augers near to their inner ends are provided with screw-threads $o$, which are tapped in stationary abutments or standards $o'$, so that by turning the augers in one direction their points are gradually fed out, and by turning them in the opposite direction their points are gradually drawn in. Said shanks pass through bevel-wheels $p$, which are connected thereto in such a manner that the augers are free to move in and out, but are compelled to rotate with the wheels. These bevel-wheels gear in other bevel-wheels, $p'$, on short arbors $p^*$, to which cog-wheels $p^2$ are attached in such a manner that they can be shifted thereon in a longitudinal direction, and that they can be thrown in or out of gear with the cog-wheels $p^3$ on the horizontal shaft $i$. By throwing one or both wheels $p^2$ in gear with one or both wheels $p^2$ motion is imparted to either one or both augers, but it will only be in an extra emergency that both augers will have to be set in motion simultaneously.

The upper deck of my vessel is perforated with a number of holes, $q$, for the sake of ventilation, and three (more or less) hatchways lead down into the hold or lower part of said vessel. Its bow forms a powerful ram, which is strongly plated with iron or steel, and near the stern is an additional lookout or pilot-house, to be used in connection with the main pilot-house or independent of the same when the latter by some accident has become deranged.

It will be readily understood, and requires no further explanation, that some of my improvements are applicable to wooden as well as to iron or iron-clad vessels; but as a whole combined they enable me to produce a vessel of the monitor class which will be capable to run steady and with considerable speed even in a heavy sea, and which will be equally invulnerable with the best and stoutest vessel now afloat.

I claim as new and desire to secure by Letters Patent—

1. The hinged adjustable keel C, applied in combination with the main keel B of a vessel, and with the vertically-adjustable rods $f$, and ropes $c$, all constructed, arranged, and operating substantially as and for the purposes specified.

2. The combination of the punches H, piston H', and steam-cylinders H³, constructed, arranged, and operating as and for the purposes specified.

3. The scuttling-augers I, applied in combination with the horizontal shaft $i$ and adjustable gear $p^2$, substantially as and for the purpose herein shown and described.

CHARLES SLATER.

Witnesses:
WM. F. McNAMARA,
M. M. LIVINGSTON.